United States Patent
Tan (10) Patent No.: US 10,408,538 B2
(45) Date of Patent: Sep. 10, 2019

(54) BOTTOM-DRYING SLUDGE DRYING DEVICE AND METHOD

(71) Applicant: GUANGZHOU ENVIRONMENTAL CREATIVE SOLUTIONS CO. LTD, Guangzhou, Guangdong (CN)

(72) Inventor: Wei Tan, Guangdong (CN)

(73) Assignee: GUANGZHOU ENVIRONMENTAL CREATIVE SOLUTIONS CO LTD, Guangzhou (CN)

( * ) Notice: Subject to any disclaimer, the term of this patent is extended or adjusted under 35 U.S.C. 154(b) by 96 days.

(21) Appl. No.: 15/542,050

(22) PCT Filed: Dec. 30, 2015

(86) PCT No.: PCT/CN2015/099778
§ 371 (c)(1),
(2) Date: Jul. 6, 2017

(87) PCT Pub. No.: WO2016/110210
PCT Pub. Date: Jul. 14, 2016

(65) Prior Publication Data
US 2018/0010852 A1    Jan. 11, 2018

(30) Foreign Application Priority Data

Jan. 7, 2015   (CN) .......................... 2015 1 0025410

(51) Int. Cl.
*F26B 11/12*    (2006.01)
*F26B 17/20*    (2006.01)
(Continued)

(52) U.S. Cl.
CPC ............ *F26B 17/205* (2013.01); *C02F 11/12* (2013.01); *C02F 11/121* (2013.01); *F26B 3/06* (2013.01);
(Continued)

(58) Field of Classification Search
CPC ...... F26B 3/00; F26B 3/06; F26B 3/08; F26B 3/082; F26B 3/0923; F26B 3/0926; F26B 17/003; F26B 21/04; F26B 21/06
(Continued)

(56) References Cited

U.S. PATENT DOCUMENTS 627,419 A * 6/1899 Hoppenstedt et al. ......................
F26B 17/205
34/166
3,559,807 A * 2/1971 Reilly .................... B01D 33/04
210/387
(Continued)

FOREIGN PATENT DOCUMENTS

CN    201000261 Y    1/2008
CN    101152966 A    4/2008
(Continued)

OTHER PUBLICATIONS

International Search Report for International Application No. PCT/CN2015/099778, dated Apr. 7, 2016, 3 pages.
(Continued)

*Primary Examiner* — John P McCormack
(74) *Attorney, Agent, or Firm* — Reising Ethington P.C.

(57) ABSTRACT

The present disclosure provides a bottom drying type sludge drying device, comprising: a housing in which a curved-face partition is provided for separating space in the housing into first and second drying chambers; a feed gate and an outlet provided on an upper portion of the first drying chamber, and a discharge gate provided on the circumferential wall of the first drying chamber. An inlet is provided on a side wall or bottom of the second drying chamber. The curved-face partition comprises a depressed area in which a communication opening is formed, and a bridge-shaped element is provided above the communication opening, forming a lateral aperture between the bridge-shaped element and the
(Continued)

partition. A sludge stirring assembly is provided in the first drying chamber, which comprises a rotary shaft and a stirring unit fixed on the rotary shaft, and the stirring unit is configured to cut, break and stir the sludge and/or that a front end thereof faces and is close to the lateral aperture, such that the front end scrapes the sludge in or at the communication opening as the stirring unit rotates. The present disclosure further provides a method of drying sludge using a sludge drying device.

20 Claims, 9 Drawing Sheets

(51) Int. Cl.
*C02F 11/12* (2019.01)
*F26B 17/10* (2006.01)
*C02F 11/121* (2019.01)
*F26B 3/06* (2006.01)
*F26B 25/00* (2006.01)
*F26B 25/04* (2006.01)
*F26B 11/16* (2006.01)

(52) U.S. Cl.
CPC ............ *F26B 11/16* (2013.01); *F26B 17/10* (2013.01); *F26B 25/002* (2013.01); *F26B 25/04* (2013.01); *F26B 2200/18* (2013.01)

(58) Field of Classification Search
USPC ......... 34/179, 180, 183, 443, 498, 507, 509, 34/184–187
See application file for complete search history.

(56) References Cited

U.S. PATENT DOCUMENTS

| | | | | |
|---|---|---|---|---|
| 3,561,598 A | * | 2/1971 | Goldberg | C02F 11/12 162/158 |
| 3,613,893 A | * | 10/1971 | Schreiber | C02F 11/16 210/272 |
| 3,720,004 A | * | 3/1973 | Okawara | C02F 11/12 110/246 |
| 4,255,389 A | * | 3/1981 | Jung | C05F 17/00 366/220 |
| 4,290,890 A | * | 9/1981 | Bauer | B63B 35/32 210/608 |
| 5,365,676 A | * | 11/1994 | Bein | F26B 3/00 34/223 |
| 2005/0155249 A1 | * | 7/2005 | Christensen | F26B 3/06 34/498 |
| 2018/0010852 A1 | * | 1/2018 | Tan | C02F 11/12 |

FOREIGN PATENT DOCUMENTS

| | | |
|---|---|---|
| CN | 101186422 A | 5/2008 |
| CN | 201338980 Y | 11/2009 |
| CN | 201600001 U | 10/2010 |
| CN | 203319838 U | 12/2013 |
| CN | 204529628 U | 8/2015 |
| CN | 204529632 U | 8/2015 |
| CN | 204529633 U | 8/2015 |
| CN | 204529634 U | 8/2015 |
| CN | 204779273 U | 11/2015 |
| CN | 204803202 U | 11/2015 |
| CN | 204803203 U | 11/2015 |
| CN | 204939233 U | 1/2016 |
| CN | 205011597 U | 2/2016 |
| CN | 105819647 A | 8/2016 |
| DE | 2306856 A1 | 8/1974 |
| JP | S6384699 A | 4/1988 |
| JP | 3127266 B2 | 1/2001 |
| JP | 2010216748 A | 9/2010 |
| WO | WO2007040318 A1 | 4/2007 |

OTHER PUBLICATIONS

Extended European Search Report on European application No. EP 15876710.3, dated Jul. 20, 2018, 8 pages.
Taiwanese Search Report corresponding to Taiwanese application No. CN105100059, dated Jun. 19, 2019, 1 page.

* cited by examiner

Fig. 11

BOTTOM-DRYING SLUDGE DRYING DEVICE AND METHOD

FIELD

The present disclosure relates to the field of sludge drying, generally to a sludge drying device, and more particularly, to a bottom drying type sludge drying device in a monolithic form and a method of drying sludge using such sludge drying device.

BACKGROUND

Effective sludge treatment is very important in a sewage treatment process. A sewage treatment plant usually reduces moisture content of the sludge from over 90% to between 60% and 80% by concentration and dehydration before implementing landfill, curing or drying treatment. Landfill tends to cause sludge fermentation, resulting in secondary environmental pollution. Existing curing or drying devices consume a large amount of energy in treating the sludge due to such characteristics of sludge as strong viscosity, aptness to cake, and hardness to disintegrate, and thus have difficulty in reducing cost and improving efficiency.

Chinese patent for invention CN101186422A provides a closed multi-chamber fluidized bed sludge drying method. The fluidized bed adopted in this method, which is energy-intensive and inefficient, has difficulty in carrying out continuous, large-scale sludge drying treatment.

The granted Chinese patent for utility model CN201000261Y, which was filed by the present applicant, provides a low-temperature sludge drying device. This drying device, while achieving drying of a certain amount of sludge, takes a long time. Hence, it consumes a great amount of energy and fails to realize the intended purpose of improving the drying efficiency.

Chinese patent for utility model CN203319838U provides a sludge curing treatment blender. The blender blends the sludge and an additive by mixing to cure the sludge. This process not only fails to remove moisture from the sludge but increases the volume of the sludge. And the cured sludge cannot be recycled.

Chinese Patent Application No. 201510006479.4 filed by the present applicant provides a bottom drying type sludge drying device, wherein as a stirring assembly in a first drying chamber stirs the sludge constantly, drying gas enters into a first drying chamber from a second drying chamber via a communication opening formed on a partition to dry the sludge piled on the partition. However, the sludge often clogs the communication opening during the sludge drying process. As a result, the drying gas has difficulty in entering into the first drying chamber smoothly via the communication opening, slowing down the sludge drying process.

Thus, there is a need for providing an improved bottom drying type drying device and a method to improve sludge drying efficiency.

SUMMARY

In order to overcome the defects in the prior art, the present disclosure provides a bottom drying type sludge drying device in a monolithic form. In the present sludge drying device, a stirring assembly in a first drying chamber cuts, breaks and stirs the sludge constantly so that the sludge contacts the drying gas frequently, solving the problem of uneven dryness of the interior and exterior portion of the sludge during the drying thereof.

In the present sludge drying device, a communication opening may be formed in a partition for separating the first drying chamber and a second drying chamber and a bridge-shaped element may be positioned above the communication opening, thereby forming a lateral aperture between the bridge-shaped element and the partition. The drying gas enters from the second drying chamber into the first drying chamber via a curved path from the communication opening to the lateral aperture, so as to dry the sludge from the bottom. As the stirring assembly cuts, breaks and stirs the sludge, granularity of the sludge changes constantly, improving looseness and liquidity of the sludge and expediting the drying of the sludge by the drying gas.

By scraping the sludge at the lateral aperture by using a lateral edge of a scraping front end of a blade or ratchet of a stirring unit of the stirring assembly or by using a lateral edge of a front end of a scraping component fixed on the blade or ratchet, the drying gas may flow smoothly from the second drying chamber into the first drying chamber.

In the present sludge drying device, arrangement of a blowing device, a draught inducing device and/or a heating device may not only increase the speed at which the drying gas flows into the drying chamber but also increase the speed at which the drying gas flows out of the drying chamber, promoting contact between the drying gas and the sludge and improving the drying efficiency.

The present drying device may be substantially in a monolithic or unitary form. It has such characteristics as high drying efficiency, low energy consumption, small floor area, and strong adaptability, and thus fully meets the current market requirements. As sewage treatment plants are scattered in densely populated cities, the present monolithic sludge drying device can be installed with minimum modification to apparatuses in the existing sewage treatment plants.

The sludge drying device and method of the present disclosure may expedite the drying of the sludge by constantly cutting, breaking and stirring the sludge in the first drying chamber using the stirring assembly provided in the first drying chamber, and by scraping the sludge at the lateral aperture using the lateral edge of the scraping front end of the blade or ratchet of the stirring unit or using the lateral edge of the front end of the scraping component fixed on the blade or ratchet. The sludge drying device and method of the present disclosure are able to solve the problems that sludge is highly viscose, apt to cake and hard to disintegrate. The sludge drying device and method of the present disclosure may not only remove moisture from the sludge significantly but also change the sludge from coarse grain into particle and powder, thereby improving the sludge drying efficiency and reducing the energy consumption.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
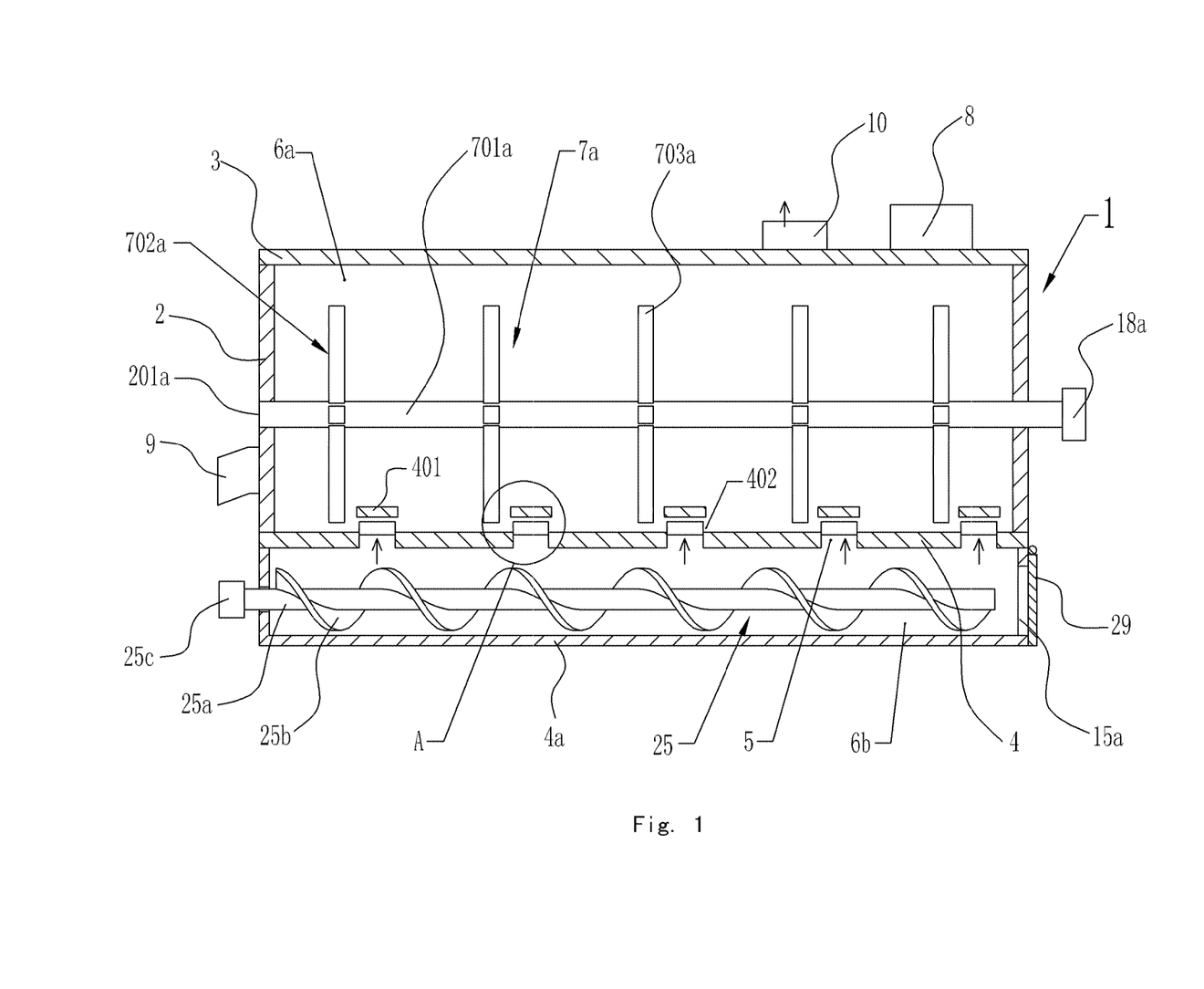
FIG. 1 is a longitudinal sectional view of a bottom drying type sludge drying device of the present disclosure.
Figure 2:
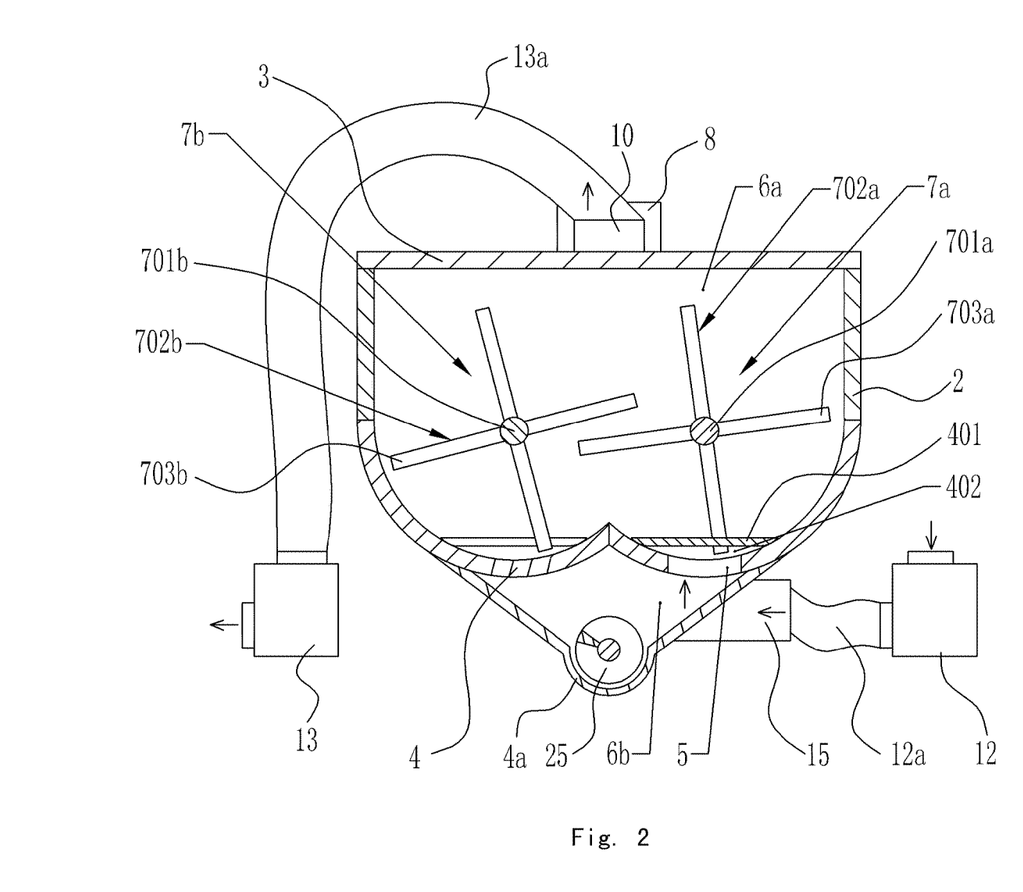
FIG. 2 is a transversal sectional view of the sludge drying device of FIG. 1.

FIG. 1 shows one preferred embodiment of a bottom drying type sludge drying device of the present disclosure. FIG. 2 is a transversal sectional view of the sludge drying device of FIG. 1, in which a sludge drying device in a monolithic or unitary form is schematically shown. The bottom drying type sludge drying device 1 comprises a housing in which a partition or separate plate 4 is provided for dividing an interior space of the housing into two chambers—a first drying chamber 6a and a second drying chamber 6b. A communication opening 5 is formed in the partition 4 for communicating the first drying chamber 6a and the second drying chamber 6b, so that drying gas may enter into the first drying chamber 6a from the second drying chamber 6b. As shown, while the first drying chamber 6a is arranged above the second drying chamber 6b, they may be arranged in various manners. The housing generally comprises a body 2, an top cover (or roof) 3 and a bottom plate 4a, wherein an upper portion of the body 2, the top cover 3 and the partition 4 define the first drying chamber 6a, and a lower portion of the body 2, the partition 4 and the bottom plate 4a define the second drying chamber 6b. However, the housing may be formed of a plurality of members or components or in various manners. For example, the upper portion of the body 2 may be formed integrally with the partition 4, wherein an upper face of the partition is used as the bottom of the first drying chamber 6a and the lower portion of the body 2 is fixed on the partition so that a lower face of the partition is used as the top of the second drying chamber 6b. Additionally, the lower portion of the body 2 may also be formed integrally with the partition 4, or the body 2 is disposed on the ground with removal of the bottom plate 4a, etc. The body 2 may be rectangular in shape, although it is possible of a square, polygon, ellipse shape or other shapes.

As shown, on the top cover 3 of the housing are provided a feed gate 8 for introducing the sludge to be dried into the first drying chamber and an outlet 10 for venting the exhaust gas or drying gas that has dried the sludge. A discharge gate 9 for the dried sludge is provided in an end wall of the upper portion of the body 2 adjacent to the partition 4 and distal from the feed gate 8. In another example, the feed gate 8 and outlet 10 for the first drying chamber may be disposed on any location on either of the body 2 and the top cover 3, i.e., any location on the upper portion of the first drying chamber 6a, as desired. Likewise, the discharge gate 9 may be disposed on any location on a circumferential or surrounding wall of the upper portion of the body 2 including a side wall and end wall, i.e., any location on the circumferential wall of the first drying chamber 6a.

Figure 3:
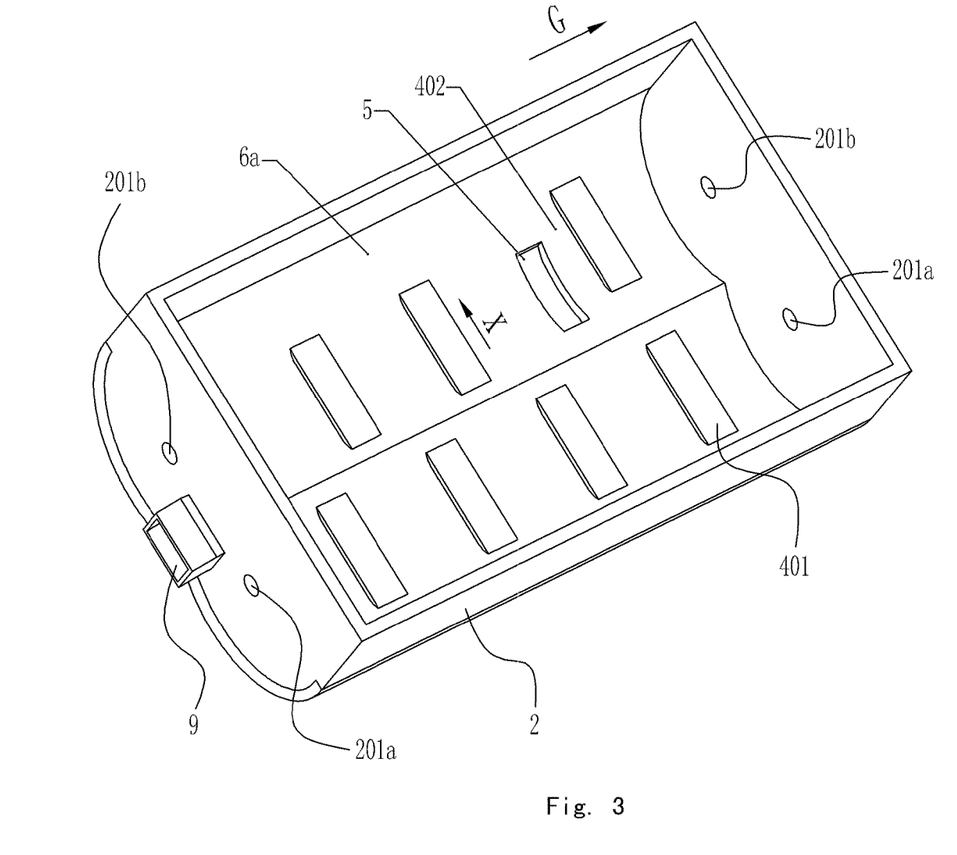
FIG. 3 is a stereoscopic schematic view of a first drying chamber of the sludge drying device of FIG. 1.

FIG. 3 shows a preferred embodiment of the first drying chamber of the sludge drying device, wherein a plurality of spaced rectangular communication openings 5 are formed or shaped in the partition 4, and a bridge-shaped element 401 is provided above each communication opening. The communication opening 5 may be of various shapes, such as trapezoid, rectangle, triangle, arch, circle, etc. One or more communication openings may be provided. In other words, there is no limitation to the shape or number of the communication opening 5, which may be determined as desired. The bridge-shaped element above the communication opening may also change accordingly based on the shape of the communication opening. The plurality of communication openings 5 are grouped in a longitudinal direction G of the housing, and the communication openings 5 in each group are spaced apart from one another by a distance. The longitudinal direction X of each communication opening 5 intersects with, preferably is perpendicular to, the longitudinal direction G of the housing.

Figure 4:
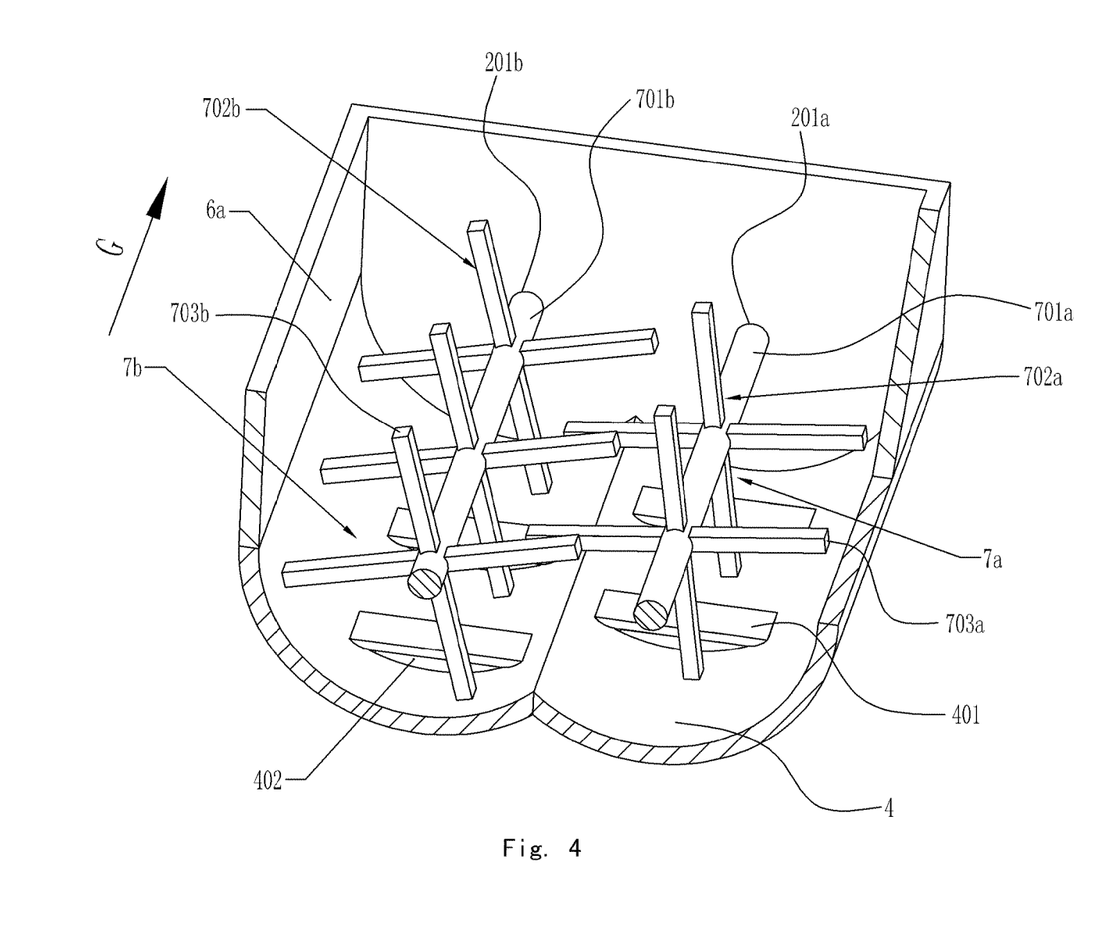
FIG. 4 is a stereoscopic schematic view of a stirring assembly disposed in the first drying chamber of FIG. 3.

FIG. 4 shows a preferred embodiment of the stirring assembly disposed in the first drying chamber of FIG. 3, wherein two stirring assemblies 7a, 7b for stirring or flipping the sludge are arranged in parallel to one another in the longitudinal direction G of the housing. Since the two stirring assemblies 7a, 7b have the same or similar configurations, only one of them, for example stirring assembly 7a, is described herein. The stirring assembly 7a comprises a rotary shaft 701a and a stirring unit 702a fixed on the rotary shaft 701a for stirring the sludge. The stirring unit 702a includes four blades or ratchets 703a, each extending radially outwardly from the rotary shaft 701a. Hence, the stirring unit 702a, which rotates with the rotary shaft 701a, is similar in contour to a vane of a propeller. However, the shape of the stirring unit 702a is not such limited, and may be designed to be similar to a shape of a gear. One or more stirring units 702a may be provided on the rotary shaft 701a, and each stirring unit 702a may comprise one or more blades or ratchets 703a. However, the plurality of blades or ratchets 703a of each stirring unit 702a may extend different lengths from the rotary shaft 701a. At least one of the plurality of stirring units 702a may have a longer blade(s) or ratchet(s), while others may have a shorter blade(s) or ratchet(s). While the blades or ratchets as shown are fixedly mounted on the rotary shaft 701a by welding, it may be fixed by bolting, riveting or others. For example, the blades or ratchets may be connected or fixed on a shaft collar, shaft sleeve or hub (not shown), which may be then mounted on the rotary shaft 701a. Two ends of the rotary shaft 701a may be mounted in holes 201a or 201b in opposite end walls of the body 2 via a bearing, respectively, as shown in FIG. 3.

Drying gas (see the arrows in FIG. 1) enters into the first drying chamber 6a from the second drying chamber 6b via the communication opening 5 in the partition 4 and is discharged via the discharge gate 10 after interaction with the sludge, which increases the opportunities for the drying gas to contact the sludge. However, after the sludge to be dried is fed into the first drying chamber 6a via the feed gate 8 and piled on the partition 4, a portion of the sludge would drop or leak into the second drying chamber 6b from the first drying chamber 6a via the communication opening 5 as the stirring units 702a, 702b of the stirring assemblies 7a, 7b stir or flip and the drying gas works on the sludge. In order to reduce leakage of the sludge, a bridge-shaped element 401 is provided above the communication opening 5 for decreasing leakage of the sludge to the second drying chamber 6b via the communication opening. Referring to FIGS. 2-4, the partition 4 between the first drying chamber 6a and second drying chamber 6b is a curved plate, although it may be a flat plate with a depressed upper surface. Viewed in a direction transverse to the longitudinal direction G of the housing, a shape of the partition 4 in cross section is downwardly curved or has an upper surface with depression. In other words, the curved segment of the depressed area or portion protrudes downwardly from the first drying chamber 6a to the second drying chamber 6b, or the first drying chamber 6a has a concave bottom. Hence, the partition assumes a depressed area in the longitudinal direction G of the housing. As shown, the areas of the curved-face partition 4 facing each of the two stirring assemblies 7a, 7b are depressed, preferably each depressed area corresponds to the stirring unit 702a or 702b, respectively. The depressed area may have a shape of arc. The bridge-shaped element provided above the communication opening may be a plate element, such as a flat plate, curved plate and herringbone plate. In addition, a bridge-shaped element 401 may be provided on one or more communication openings 5, and the numbers of the communication opening and the bridge-shaped element need not be the same.

The bridge-shaped element 401 strides over the communication opening 5 along the longitudinal direction X of the communication opening 5, and is substantially parallel to said longitudinal direction. The bridge-shaped element 401 has a greater length than the communication opening 5, so that the bridge-shaped element 401 stride across the communication opening 5 in the longitudinal direction of the communication opening 5 like a bridge. The two ends of the bridge-shaped element 401 are fixed on the partition 4 adjacent to the end edge of the communication opening, respectively. Since the middle section of the bridge-shaped element 401 is above the communication opening 5, a lateral aperture 402 is defined or appears between the bridge-shaped element 401 and the partition 4. Alternatively, a lateral aperture 402 may be defined at one side of the bridge-shaped element 401 or each of the two sides of the bridge-shaped element 401. While the bridge-shaped element 401 above the communication opening 5 facilitates reducing the fall or leakage of the sludge from the first drying chamber 6a to the second drying chamber 6b, the sludge accumulated at the lateral aperture interferes with entry of the drying gas from the second drying chamber 6b into the first drying chamber 6a. In order to promote travelling of the drying gas, the blade or ratchets 703a, 703b of the stirring units 702a, 702b are designed to be able to scrape the sludge at the lateral aperture 402 of the bridge-shaped element 401. The space between the stirring units 702a, 702b of the stirring assemblies 7a, 7b on the respective rotary shafts 701a, 701b may be determined by the distance between a plurality of communication openings or bridge-shaped elements in each row on the partition 4, so as to ensure that as the rotary shaft rotates, the lateral edge of the front end of the longer blade or ratchets 703a, 703b of each stirring units 702a, 702b or the lateral edge of the front end of the scraping components 704a, 704b mounted on the blade or ratchets 703a, 703b scrape the sludge at the lateral aperture 402 of the bridge-shaped element 401. In addition, a disc-shaped or gear-shaped stirring unit may stir the sludge with a lateral edge of a protrusion or tooth on its outer perimeter or top end. As shown in FIGS. 2 and 4, the two stirring assemblies 7a, 7b are arranged such that the first stirring unit 702a on the first rotary shaft 701a and the second stirring unit 702b on the second rotary shaft 701b correspond to two rows of spaced communication openings 5 or bridge-shaped elements 401 thereabove, respectively. In order for the drying gas to enter smoothly from the second drying chamber 6b into the first drying chamber 6a via the communication opening 5, the blade or ratchets 703a, 703b of the stirring units 702a, 702b of the stirring assemblies 7a, 7b may be long enough so that when the stirring units 702a, 702b rotates with the rotary shafts 701a, 701b, the lateral edge of the front end of the blade or ratchets may scrape the sludge at the lateral aperture 402. In general, at least one of the plurality of stirring units 702a, 702b may have at least one blade or ratchets 703a, 703b whose top end may scrape the sludge. The numbers of the stirring units 702a, 702b and the communication opening 5 or bridge-shaped element 401 thereabove need not be the same.

Figure 5:
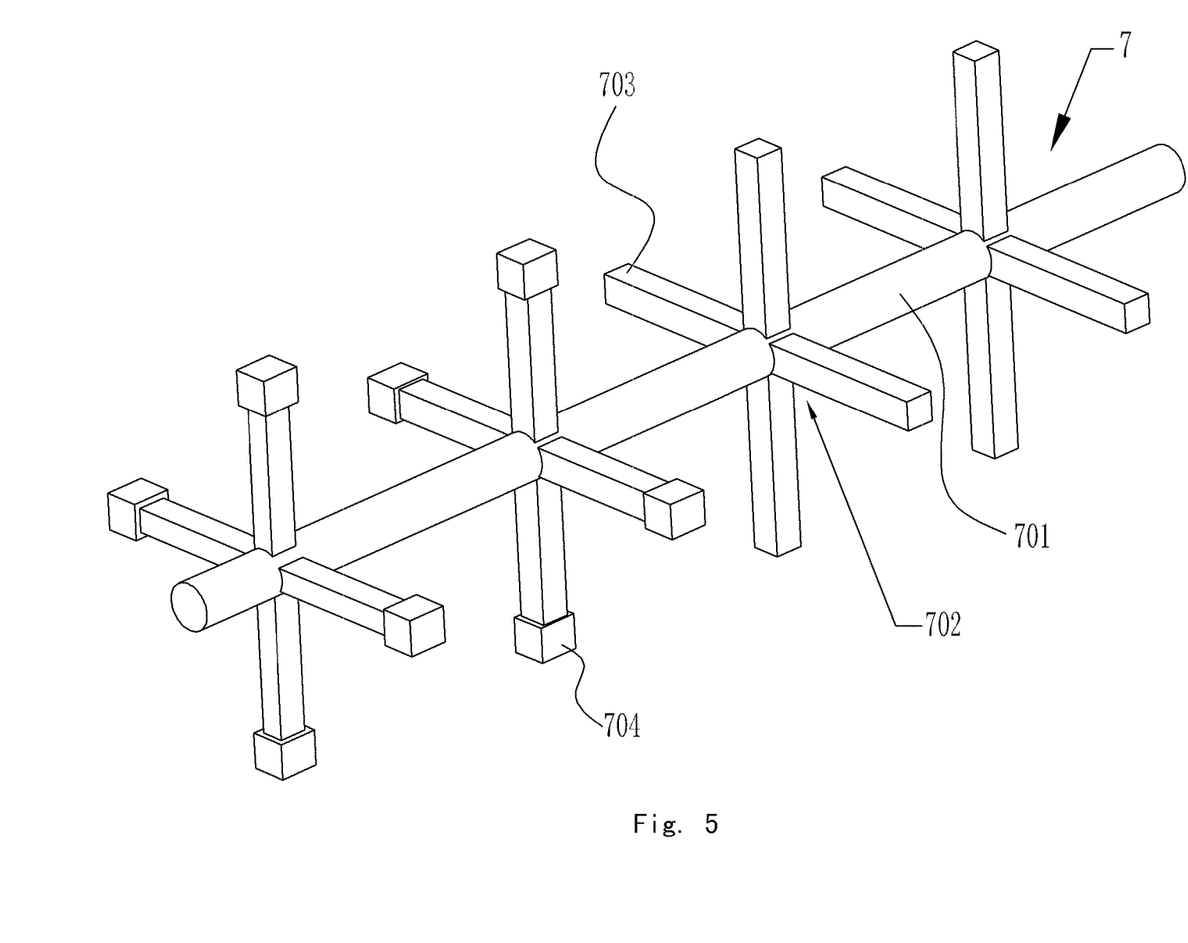
FIG. 5 is a stereoscopic schematic view of the stirring assembly of the sludge drying device.

FIG. 5 shows another example of the stirring assembly. The stirring assembly 7 comprises a rotary shaft 701 and a stirring unit 702 fixed on the rotary shaft, wherein the stirring unit 702 has a blade or ratchet 703 whose front end is used for scraping sludge. Scraping components 704 are mounted on the blades or ratchets 703 of two stirring units, wherein the blade or ratchet on which a scraping component is mounted is of the same length as other blades or ratchets, and wherein the scraping component mounted on the blade or ratchet performs the same function as the scraping front end of other blades or ratchets. In yet another example, the blades or ratchets of the stirring unit 702 may have different lengths, and a scraping component 704 may be mounted on a shorter blade or ratchet, for example on the front end thereof, as desired.

Figure 6:
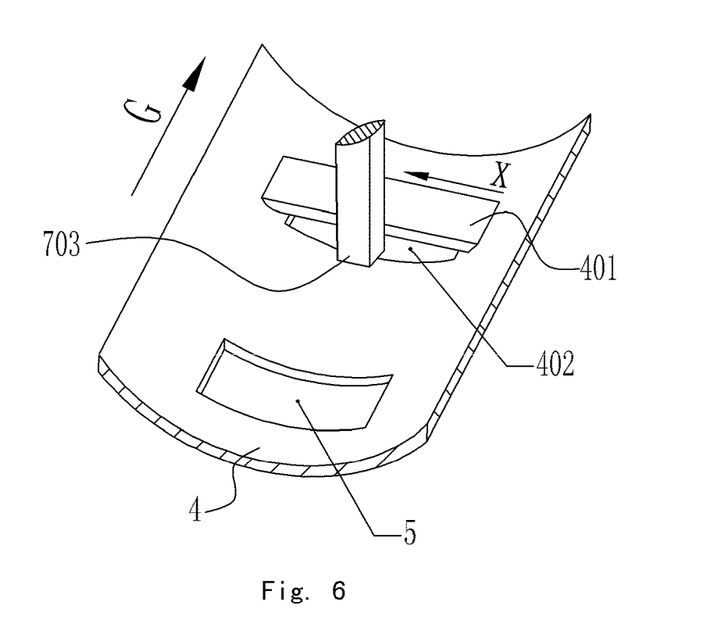
FIG. 6 is a stereoscopic view of an enlarged bridge-shaped element in the circle A of FIG. 1.
Figure 7:
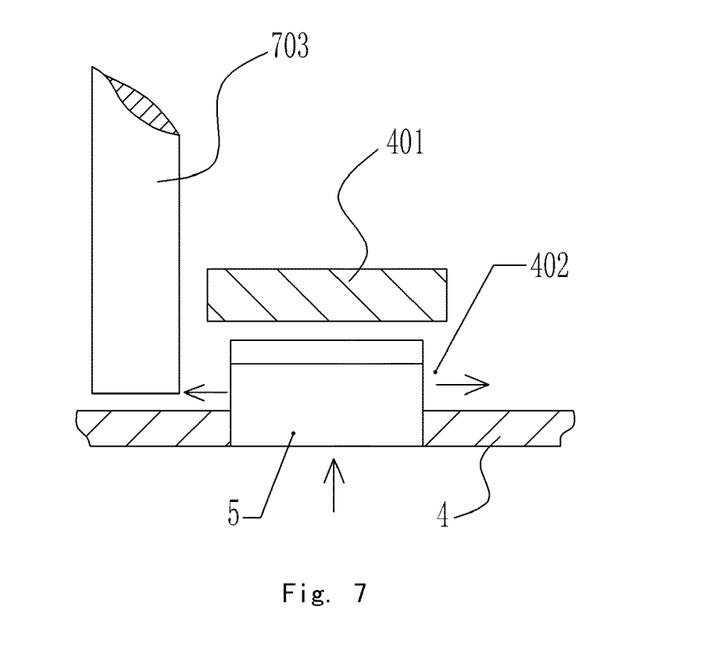
FIG. 7 is a sectional view of the bridge-shaped element of FIG. 6 taken in the longitudinal direction of a housing.

FIGS. 6-7 show the bridge-shaped element in circle A of FIG. 1 in a stereoscopic view and sectional view, respectively. The scraping front end of the blade or ratchet 703 of the stirring unit is next to the lateral aperture 402 defined between the bridge-shaped element 401 and partition 4. The stirring unit 702 fixed on the rotary shaft is arranged to correspond to the bridge-shaped element such that the lateral edge of the scraping front end of the blade or ratchet 703 of the stirring unit 702 or the lateral edge of the front end of the scraping component fixed on the blade or ratchet faces the lateral aperture of the bridge-shaped element, so as to scrape the sludge at the lateral aperture of the bridge-shaped element as the stirring unit rotates, whereby the drying gas that has entered into the communication opening 5 flows smoothly into the first drying chamber 6a via the lateral aperture 402. Besides scraping, the blade or ratchet of the stirring units 702a, 702b functions to cut, break (or smash) and stir the sludge. Additionally, the blade or ratchet of the stirring unit having a scraping front end or having a scraping component fixed on the front end thereof may be positioned between two bridge-shaped elements 401, such that the lateral edge of the front end of the blade or ratchet or the lateral edge of the front end of the scraping component fixed on the blade or ratchet sweeps the lateral apertures 402 on opposite sides of the two bridge-shaped elements 401.

Figure 8:
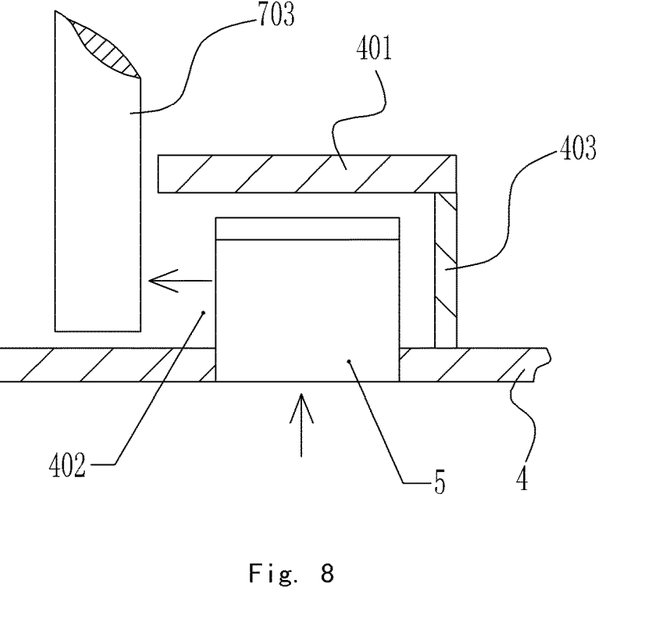
FIG. 8 is a locally sectional view of another bridge-shaped element.

FIG. 8 shows another example of the bridge-shaped element, wherein a baffle 403 is provided, in the width direction of the bridge-shaped element 401, i.e., the direction substantially transverse to the longitudinal direction G of the housing, to block one of the lateral apertures 402 and leaves the other, so as to permit the drying gas to enter into the first drying chamber 6a in a single direction. The baffle 403 is disposed in the lateral aperture 402 in the longitudinal direction of the bridge-shaped element 401 so as to prevent flow of the drying gas therethrough, whereby the stirring unit 702 of the stirring assembly 7 may only scrape the sludge at the other lateral aperture 402. Such arrangement of the baffle 403 is for the purpose of causing the drying gas to flow out of the lateral aperture 402 into the first drying chamber 6a only in one direction, and preventing the drying gas from entering the first drying chamber in an opposite direction to reduce leakage of the sludge.

Figure 9:
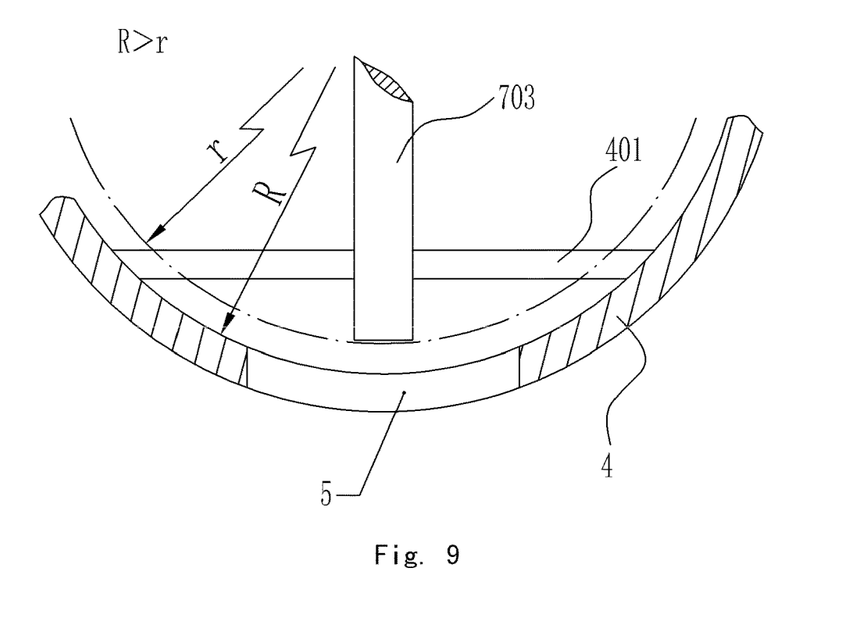
FIG. 9 is a view of the bridge-shaped element of FIG. 6 viewed along the longitudinal direction of a housing.

FIG. 9 shows the location of the bridge-shaped element of FIG. 6 on the partition viewed in the longitudinal direction of the housing, where the front end of the blade or ratchet 703 of the stirring unit is close to the bottom of the drying chamber, and the distance between the top end of the blade or ratchet 703 and the partition is substantially equal in the scraping range. It should be appreciated that when the rotary shaft of the stirring assembly or the hole for mounting the rotary shaft is adjusted in the vertical direction of the housing, a distance between an axis of the rotary shaft and the partition would change. Hence, a distance between the top end of the blade or ratchet and the partition may be determined by selecting the length of the blade or ratchet, so as to determine the amount of sludge to be scraped. In other words, the stirring assembly is sized such that the distance r between the axis of the rotary shaft and the top end of the longest blade or ratchet of the stirring unit is smaller than the radius R of a depressed and arced area of the curved-face partition. Since the rotary shafts 701a, 701b of the stirring assemblies 7a, 7b are arranged in parallel to the longitudinal direction G of the housing, the rotary shaft intersects with, preferably is perpendicular to, the longitudinal direction of the communication opening or bridge-shaped element. Hence, the orientation or opening direction of the lateral aperture 402 is substantially parallel to the axial direction of the rotary shaft or the longitudinal direction G of the housing. The drying gas could reach the first drying chamber 6a only by diverting through the lateral aperture after flowing into the communication opening 5. Likewise, the sludge could leak from the first drying chamber 6a into the second drying chamber 6b only through the curved path from the lateral aperture 402 to the communication opening 5, whereby the amount of sludge leakage is greatly reduced. Scraping of the sludge at the lateral aperture 402 may not only reduce the amount of leakage of the sludge but also expedite flow of the drying gas and improve the sludge drying efficiency.

Referring back to FIG. 4, in the two stirring assemblies 7a, 7b arranged in a staggered manner, the scraping front end of the blade or ratchet of the first stirring unit 702a on the first rotary shaft 701a or the front end of the scraping component fixed on the blade or ratchet is close to the second rotary shaft 701b and locates between two adjacent second stirring units 702b, and vice versa, thereby shortening the distance between axes of the first rotary shaft 701a and second rotary shaft 701b and preventing interference between the first stirring unit 702a and second stirring unit 702b. In another example, two adjacent stirring units on the same rotary shaft may be grouped, and each group of stirring units 702a on the first rotary shaft 701a and each group of stirring units 702b on the second rotary shaft 701b are arranged in a staggered manner, such that a group of stirring units 702a on the first rotary shaft 701a is located between two adjacent stirring units 702b on the second rotary shaft 701b. In yet another example, three adjacent stirring units on the same rotary shaft may be grouped, and each group of stirring units on each rotary shaft and each group of stirring units on the other rotary shaft are arranged in a staggered manner. No matter how the stirring units are arranged on the rotary shaft, it should be ensured that most of the stirring units correspond to the plurality of communication openings 5 or bridge-shaped elements 401 thereabove, respectively, so that the scraping front end of the blade or ratchets 703a, 703b of the stirring units 702a, 702b or the front end of the scraping components 704a, 704b fixed on the blade or ratchet may scrape the sludge at the lateral aperture 402 of the bridge-shaped element 401, whereby the drying gas flows smoothly into the first drying chamber 6a. In a word, the position of the communication opening or bridge-shaped element on the partition correlates to the position of the stirring unit on the rotary shaft.

As shown, the rotary shafts 701a, 701b of the first stirring assembly 7a and second stirring assembly 7b are each provided at one end with a power input component connected with a transmission (not shown). Driven by an external power equipment, the transmission drives the rotary shafts 701a, 701b to rotate in turn, such that the power input component on the rotary shafts 701a, 701b, such as gear or belt pulley 18a, drives one of the rotary shafts 701a, 701b and thus rotates the other. The first rotary shaft 701a and the second rotary shaft 701b may not only rotate in opposite directions with respect to each other but also rotate in the same direction.

As shown, the shape of the lateral aperture 402 depends on the shape of the bridge-shaped element 401 and the depressed upper surface of the partition. Preferably, the shape of the cross-section of the depressed area or portion of the partition 4 matches a rotation trace of the scraping front end of the blade or ratchets 703a, 703b of the stirring units 702a, 702b of each stirring assemblies 7a, 7b or the top end of the scraping components 704a, 704b fixed on the blade or ratchet. For example, when the bridge-shaped element 401 is a flat plate and the depressed area of the partition 4 is arced, the lateral aperture 402 has a crescent shape. Preferably, a radius R of the depressed and arced area of the curved-face partition facing the stirring assembly is slightly greater than a distance r between the axis of the rotary shaft and the top end of the stirring unit.

Figure 10:
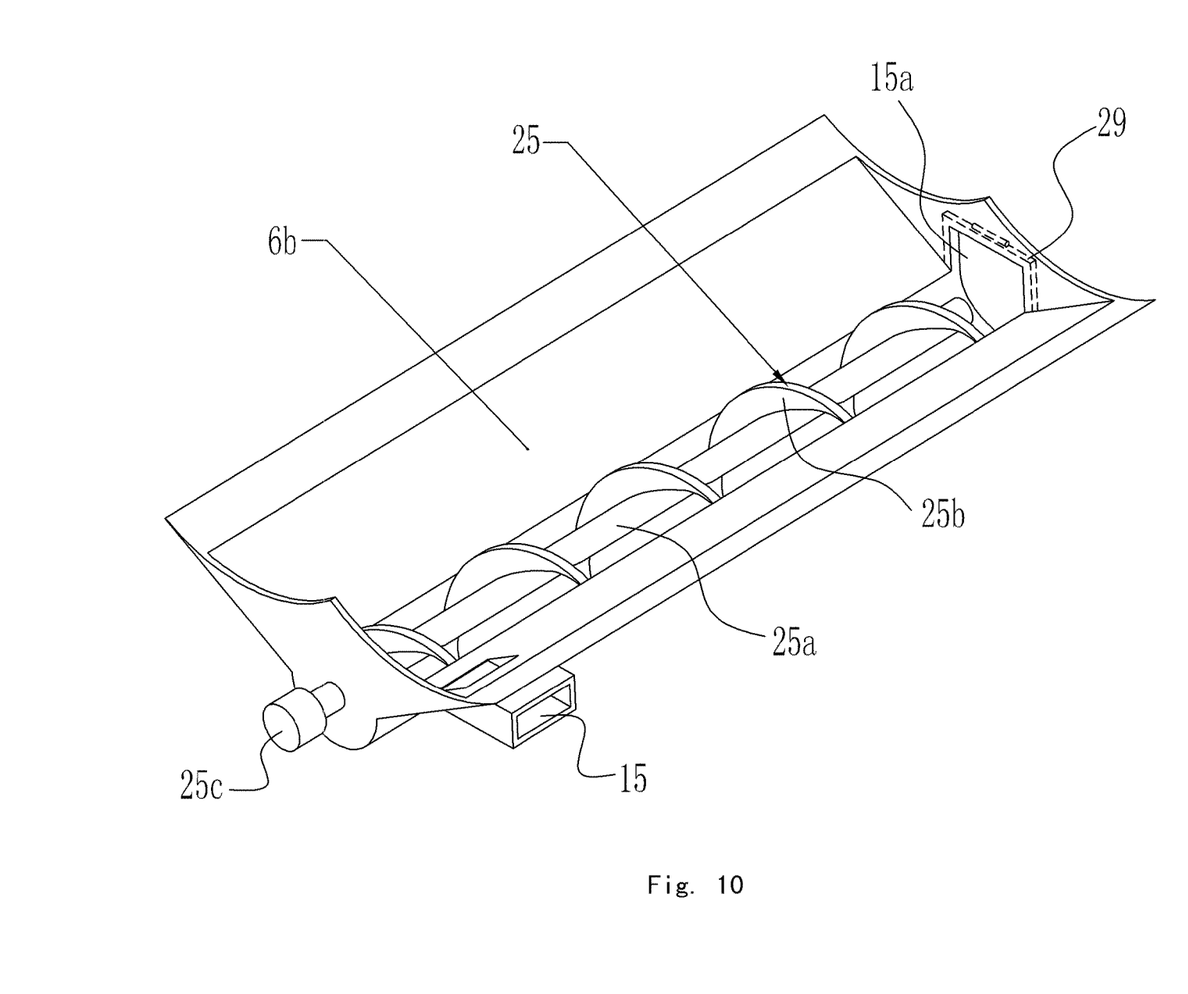
FIG. 10 is a stereoscopic schematic view of a second drying chamber of the sludge drying device of FIG. 1.

FIG. 10 shows a preferred embodiment of the second drying chamber of the sludge drying device. The second drying chamber 6b comprises an inlet 15 provided in a side of a lower portion of the body 2, i.e., the inlet 15 is positioned in the side wall or bottom of the second drying chamber 6b so that the drying gas for the sludge to be dried may enter into the second drying chamber 6b. There may be one or more inlets. Although the bridge-shaped element 401 above the communication opening 5 of the partition 4 and the scraping of the sludge at the lateral aperture 402 of the bridge-shaped element 401 by the scraping front end of the blade or ratchet of the stirring units 702a, 702b or by the front end of the scraping components 704a, 704b fixed on the blade or ratchet facilitate reducing the amount of sludge that falls from the first drying chamber 6a into the second drying chamber 6b, there may still be some sludge that leaks into the second drying chamber 6b through the curved path from the lateral aperture 402 to the communication opening 5. In order to remove the sludge that leaks into the second drying chamber 6b, a clearing gate 15a is provided at an end of the lower portion of the body 2, i.e., a clearing gate 15a is provided in the end wall of the second drying chamber 6b close to the bottom thereof. The clearing gate 15a is used for removing the sludge accumulated in the second drying chamber 6b. In addition, the clearing gate 15a may be provided in the circumferential wall including the side wall and end wall or in the bottom. A discharge assembly 25 is provided in the second drying chamber 6b close to the bottom plate 4a. The discharge assembly 25 may be a helical conveyor, although it may be a belt convey, net chain convey, gas convey device or the like. The helical conveyor includes a rotary shaft 25a and a helix 25b fixed on the rotary shaft 25a, wherein the rotary shaft 25a is supported in the end wall at the lower portion of the body 2. One end of the rotary shaft 25a is provided with a power input component 25c, and the other end extends into the clearing gate 15a. When the transmission drives the rotary shaft 25a to rotate, the helix 25b carries the sludge to the clearing gate 15a in one end of the second drying chamber 6b, and discharges it out of the housing. The second drying chamber 6b is substantially funnel-shaped in the cross direction. The side wall of the second drying chamber 6, i.e., the side wall of the body 2 at the lower portion narrows gradually towards the bottom plate 4a, and the shape at the narrowed portion, i.e., at the bottom plate 4a, is an arc or semi-circle. A radius of the arc or semi-circle is slightly greater than that of the rotation trace of the outer perimeter of the helix 25b, whereby a longitudinal passage or channel with an arc-shaped cross-section is defined or formed at the bottom of the second drying chamber 6b. The sludge that leaks from the first drying chamber 6a through the lateral aperture 402 may accumulate in the longitudinal passage of the arc-shaped cross-section so as to be discharged conveniently out of the housing by the helix conveyor provided in the longitudinal passage. The sludge that leaks into the second drying chamber 6b may be re-dried or dried again by the drying gas in the second drying chamber 6b so as to further reduce the moisture content of the sludge. In another example, an unloading port and a detachable plate for blocking the unloading port may be formed on the side wall of the body 2 at the lower portion. Once there is an excessive amount of sludge in the second drying chamber 6b, the detachable plate may be removed to clear the sludge so as to ensure a smooth flow of the drying gas in the second drying chamber 6b. In order to maintain the second drying chamber 6b to be sealed, a movable baffle 29 may be provided at the clearing gate 15a so that the drying gas does not escape. The movable baffle 29 is actuated when the sludge is discharged.

Referring back to FIG. 2, the sludge drying device 1 further comprises a blowing device 12 not shown in FIG. 1. The blowing device 12 is in communication with the second drying chamber 6b via a pipeline 12a and gas inlet 15 so as to blow drying gas into the second drying chamber 6b. The sludge drying device 1 may further comprise a draught inducing device 13, which is in communication with the first drying chamber 6a via a pipeline 13a and outlet 10. The drying gas conveyed into the second drying chamber 6b may be such drying media as hot gas, gas containing chemical substances, hot air, gas in ambient temperature and refrigerated gas, and it may also be a specially prepared drying medium. The blowing device 12 may serve to increase the speed at which the drying gas flows into the second drying chamber 6b, and the draught inducing device 13 may accelerate flow out of the exhaust gas from the first drying chamber 6a. Typically, the blowing device may be a blower or fan, and the draught inducing device may be an induced-draught fan. Additionally, the blowing device 12 may be replaced with a supercharging device for conveying drying gas into the second drying chamber 6b at a certain pressure so that the drying gas flows into the second drying chamber 6b at a higher speed. Likewise, the draught inducing device 13 may be replaced with a pressure-relief device so as to accelerate flow of the exhaust gas, thereby improving the sludge drying efficiency.

In order to accelerate the drying of the sludge, the drying gas conveyed into the second drying chamber 6b may be heated. A heating device (not shown) may be provided separately upstream or downstream of the blowing device, or formed integrally with the blowing device. Heated drying gas conveyed by the blowing device or supercharging device into the second drying chamber 6b can re-dry the sludge therein. When the heated drying gas dries again the sludge that falls or leaks into the second drying chamber 6b, part of the energy may be transmitted to the sludge lying on the partition 4 via the body 2 and partition 4 which are made of metal, achieving auxiliary drying of the sludge in the first drying chamber 6a.

Referring back to FIGS. 1 and 2, sludge may be dried with the monolithic bottom drying type sludge drying device 1 of the present disclosure. As the sludge to be dried is delivered into the first drying chamber 6a by a conveying device not shown, an external power equipment drives a rotary shaft to rotate via a transmission and power input component, thereby causing the stirring unit to rotate. Each blade or ratchet of the stirring unit keeps stirring the sludge. As the stirring unit cuts, breaks and stirs the sludge constantly, the lateral edge of the scraping front end of at least one blade or ratchet of the stirring unit or the lateral edge of the front end of the scraping component mounted on the blade or ratchet scrapes the sludge at the lateral aperture 402 at a certain time interval. The blowing device 12 conveys drying gas into the second drying chamber 6b via the pipeline 12a and gas inlet 15. The flow rate at which the drying gas enters into the second drying chamber 6b is correlated with the forced draught speed. The scraping of the sludge at the lateral aperture 402 by the lateral edge of the front end of the blade or ratchet of the stirring unit or by the lateral edge of the front end of the scraping component mounted on the blade or ratchet facilitates entry of the drying gas into the first drying chamber 6a. As the blade or ratchet of the stirring unit in the first drying chamber 6a cuts, breaks and stirs the sludge and the drying gas dries the sludge, the granularity of the sludge varies progressively and the sludge changes gradually from coarse grain to particle and powder, thereby raising the dryness of the sludge increasingly. After the drying of the sludge is completed, the drying gas is introduced by the draught inducing device 13 into the atmosphere or a gas treatment system for subsequent treatment via the outlet 10 in the upper portion of the first drying chamber 6a and the pipeline 13a. After being dried, the sludge has significantly lower moisture content, and is discharged from the discharge gate 9.

The configuration that the rotation trace of the top end of the stirring unit of the stirring assembly or of the top end of the scraping component on the blade or ratchet matches the depressed arced shape of the curved-face partition 4 at an area adjacent to the communication opening 5 or bridge-shaped element 401 facilitates accumulation of the sludge to be dried entering into the first drying chamber 6a in a lower position on the depressed arced area. As the lateral edge of the scraping front end of the blade or ratchet of the stirring unit or the lateral edge of the front end of the scraping component mounted on the blade or ratchet sweeps the lateral aperture 402 to remove the sludge at the lateral aperture 402, the scraped and stirred sludge would fall back more easily to the lower position in the first drying chamber 6a along the depressed arced contour of the partition, thereby increasing the frequency of contact between the drying gas and the sludge.

In order to remove the sludge that falls or leaks into the second drying chamber 6b from the first drying chamber 6a via the curved path from the lateral aperture 402 to the communication opening 5, the discharge assembly 25a may be operated continuously or intermittently. Hence, the sludge that leaks into the second drying chamber 6b from the first drying chamber 6a may fall along an inclined side wall into the longitudinal passage of an arced cross-section in the bottom of the second drying chamber 6b and may be discharged by the discharge assembly through the clearing gate 15a at an end of the housing.

In a monolithic bottom drying type sludge drying device, hot drying gas is usually used to dry the sludge. Thus, the hot drying gas, after being heated by a heating device, may be conveyed by a blowing device into the second drying chamber 6b, or the drying gas conveyed by a blowing device may pass through a heating device.

Figure 11:
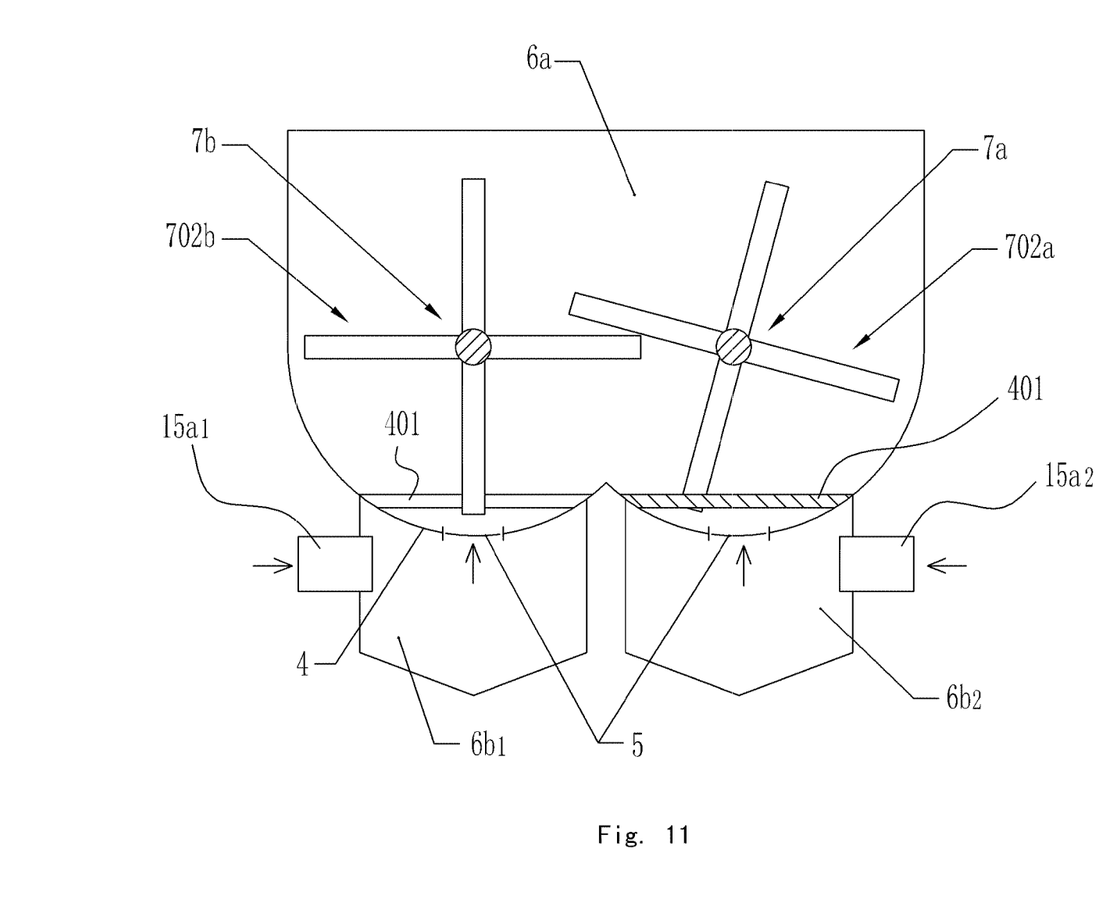
FIG. 11 is a transversal sectional view of another bottom drying type sludge drying device of the invention.

The present bottom drying type sludge drying device may be of various configurations. For example, FIG. 11 shows another example of the sludge drying device. The sludge drying device 1 comprises two second drying chambers 6b1 and 6b2, and one first drying chamber 6a. Two parallel stirring assemblies 7a, 7b are provided in first drying chamber 6a, and the stirring units 702a, 702b of each stirring assemblies 7a, 7b correspond to a depressed arced area of the partition 4. Communication openings 5 are shaped in the depressed arced area of the partition 4, respectively, and a bridge-shaped element 401 may be each provided in the communication opening 5. The second drying chambers 6b1 and 6b2 correspond to the corresponding depressed areas of the partition 4, respectively, and are located therebelow, so as to receive sludge that leaks from the first drying chamber 6a and convey drying gas into the first drying chamber 6a. In other words, combination of each second drying chamber 6b1 or 6b2 with the corresponding portion of the first drying chamber 6a is similar to the sludge drying device 1 disclosed above in terms of structure and function. A person skilled in the art may of course conceive other configurations of the bottom drying type sludge drying device, which do not need to be elaborated herein.

In addition, as shown in FIG. 1, in order to facilitate improving the sludge drying effect, it is advantageous to shape the feed gate 8 in the top cover 3 close to one end of the housing, the discharge gate 9 at the other end, and the outlet 10 on the same end as the feed gate 8; and to use the stirring assemblies 7a, 7b by a stirring assembly which may not only stir the sludge but also push the sludge to move in the longitudinal direction G of the housing. When the sludge to be dried is conveyed from the feed gate 8 into the first drying chamber 6a and laid on the partition 4, as the drying gas that enters into the first drying chamber 6a from the second drying chamber 6b via the curved path from the communication opening 5 to the lateral aperture 402 dries the sludge constantly and as the stirring assemblies 7a, 7b cuts, breaks and stirs the sludge, the granularity of the sludge varies progressively, and the sludge changes gradually from coarse grain into particle and powder, while the moisture content of the sludge decreases gradually. The stirring assemblies 7a, 7b push the sludge towards the discharge gate 9 while stirring the sludge. Therefore, the closer to the discharge gate 9 is, the drier the sludge is, and the more smoothly the drying gas in its vicinity enters into the first drying chamber 6a via the lateral aperture 402. Thus, after passing through the sludge, the drying gas at the discharge gate 9 may also dry the surface layer of the sludge from the discharge gate to the feed gate in the longitudinal direction G of the housing, prolonging the time of contact of the drying gas and the sludge.

While the present application discloses a plurality of preferred embodiments, it is not restricted to the recitations herein. Those skilled in the art can readily make variations or modifications of the components, assemblies, or elements of the bottom drying type sludge drying device of the present disclosure within the spirit of the present disclosure, and such variations or modifications would fall in the scope of the concept of the present disclosure.

The invention claimed is:

1. A bottom drying type sludge drying device comprising:
a housing provided with a partition having a curved face for separating a space in the housing into at least one first drying chamber and at least one second drying chamber;
a feed gate for sludge to be dried and an outlet for drying gas that has dried the sludge provided in an upper portion of the at least one first drying chamber, respectively, and a discharge gate for the dried sludge provided in a circumferential wall of the at least one first drying chamber;
at least one inlet for the drying gas for the sludge to be dried provided in a side wall or bottom of the at least one second drying chamber;
the partition having at least one depressed area, wherein at least one communication opening is shaped at the depressed area, and a bridge-shaped element is positioned above the at least one communication opening, whereby at least one lateral aperture is defined between the bridge-shaped element and the partition; and
at least one sludge stirring assembly provided in the at least one first drying chamber, having a rotary shaft and at least one stirring unit fixed on the rotary shaft, wherein the at least one stirring unit is configured to cut, break and stir the sludge and/or configured so that a front end thereof faces and is close to the at least one lateral aperture, such that the front end scrapes the sludge in or at the at least one communication opening as the at least one stirring unit rotates.

2. The sludge drying device according to claim 1, wherein the partition comprises a curved plate.

3. The sludge drying device according to claim 1, wherein the depressed area of the partition is of an arced shape.

4. The sludge drying device according to claim 1, wherein a longitudinal direction of the at least one communication opening intersects with or is perpendicular to a longitudinal direction of the housing, wherein the bridge-shaped element strides over the communication opening along the longitudinal direction of the communication opening and is substantially parallel to said longitudinal direction of the communication opening.

5. The sludge drying device according to claim 1, wherein there is a curved path from the at least one communication opening to the at least one lateral aperture such that the drying gas enters from the at least one second drying chamber into the at least one first drying chamber.

6. The sludge drying device according to claim 1, wherein the at least one lateral aperture comprises two lateral apertures, one of which is provided with a baffle for obstructing entry of the drying gas into the first drying chamber therethrough.

7. The sludge drying device according to claim 1, wherein the at least one stirring unit of the at least one sludge stirring assembly has at least one blade or ratchet extending radially outwardly from the rotary shaft to cut, break and stir the sludge in the first drying chamber.

8. The sludge drying device according to claim 1, wherein the at least one stirring unit of the at least one sludge stirring assembly has at least one blade or ratchet extending radially outwardly from the rotary shaft, wherein a lateral edge of a front end of the at least one blade or ratchet can scrape or partially scrape the sludge at the at least one lateral aperture.

9. The sludge drying device according to claim 1, wherein the at least one stirring unit of the at least one sludge stirring assembly has at least one blade or ratchet extending radially outwardly from the rotary shaft, wherein a lateral edge of a front end of a scraping component mounted on the at least one blade or ratchet can scrape or partially scrape the sludge at the at least one lateral aperture.

10. The sludge drying device according to claim 1, wherein the at least one communication opening in the partition has a regular or irregular shape.

11. The sludge drying device according to claim 1, wherein the bridge-shaped element may be a plate element which includes a curved plate and a flat plate.

12. The sludge drying device according to claim 1, further comprising a blowing device in communication with the second drying chamber via the at least one inlet.

13. The sludge drying device according to claim 12, further comprising a heating device for heating the drying gas, which is located upstream or downstream of the blowing device.

14. The sludge drying device according to claim 1, further comprising a draught inducing device in communication with the first drying chamber via the outlet.

15. The sludge drying device according to claim 1, wherein the at least one sludge stirring assembly includes a plurality of parallel sludge stirring assemblies, wherein each sludge stirring assembly has a plurality of stirring units, and at least one of the plurality of stirring units has at least one blade or ratchet extending radially outwardly from the rotary shaft; and the at least one communication opening includes a plurality of communication openings, wherein the at least one stirring unit corresponds to the bridge-shaped element above the plurality of communication openings, such that a lateral edge of the front end of the at least one blade or ratchet or a lateral edge of the front end of a scraping component mounted on the at least one blade or ratchet can scrape the sludge at the at least one lateral aperture of the bridge-shaped element.

16. The sludge drying device according to claim 1, wherein the at least one sludge stirring assembly includes a plurality of sludge stirring assemblies, wherein each of at least two of the plurality of sludge stirring assemblies includes a plurality of stirring units that each have at least one blade or ratchet, and wherein a lateral edge of the front end of the at least one blade or ratchet of each stirring unit or a lateral edge of the front end of a scraping component mounted on the at least one blade or ratchet can scrape the sludge at the at least one lateral aperture, wherein the plurality of stirring units of one of the at least two sludge stirring assemblies and the plurality of stirring units of the other are arranged in a staggered manner.

17. The sludge drying device according to claim 1, further comprising a clearing gate for discharging the sludge, wherein the clearing gate may be provided in a circumferential wall or bottom of the second drying chamber.

18. The sludge drying device according to claim 1, wherein the bottom of the second drying chamber defines a passage of an arched cross-section, wherein a discharge assembly is provided in the passage for discharging the sludge through the clearing gate located at an end of the second drying chamber.

19. A method for drying sludge using the sludge drying device according to any one of the preceding claims comprising the steps:
feeding sludge into the at least one first drying chamber through the feed gate for the sludge to be dried;
causing the at least one stirring unit of the at least one sludge stirring assembly provided in the at least one first drying chamber to rotate about the rotary shaft to cut, break and stir the sludge such that a front end of at least one blade or ratchet of the at least one stirring unit or a front end of a scraping component mounted on the at least one blade or ratchet can scrape the sludge at the at least one lateral aperture, wherein the at least one lateral aperture is defined by the bridge-shaped element, which is provided above the at least one communication opening defined in the partition that separates the first drying chamber and the second drying chamber, and the partition;
causing drying gas to enter into the second drying chamber through at least one inlet and to enter into the first drying chamber via a curved path defined from the at least one communication opening to the at least one lateral aperture;
discharging the drying gas that has dried the sludge and the dried sludge through the outlet and the discharge gate of the first drying chamber, respectively; and
removing the sludge that leaks into the second drying chamber via the curved path through the clearing gate for discharging the sludge.

20. The method of drying sludge according to claim 19 further comprising a step of blowing drying gas, which blows drying gas with a blowing device such that the drying gas enters into the second drying chamber through the at least one inlet.

* * * * *